(12) United States Patent
Jones, Jr.

(10) Patent No.: US 6,421,766 B1
(45) Date of Patent: Jul. 16, 2002

(54) METHOD AND APPARATUS FOR APPROXIMATED LEAST-RECENTLY-USED ALGORITHM MEMORY REPLACEMENT

(75) Inventor: Morris E. Jones, Jr., Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/215,890

(22) Filed: Dec. 16, 1998

(51) Int. Cl.[7] .............................................. G06F 12/00
(52) U.S. Cl. ...................................... 711/160; 711/136
(58) Field of Search ................................. 711/136, 160, 711/133, 134, 135, 159

(56) References Cited

U.S. PATENT DOCUMENTS

| | | | | |
|---|---|---|---|---|
| 4,414,629 A | | 11/1983 | Waite | 705/28 |
| 5,588,135 A | * | 12/1996 | Tanaka | 711/160 |
| 5,706,467 A | * | 1/1998 | Vishlitzky et al. | 711/129 |
| 5,751,993 A | * | 5/1998 | Ofek et al. | 711/136 |

* cited by examiner

Primary Examiner—Matthew Kim
Assistant Examiner—Matthew D. Anderson
(74) Attorney, Agent, or Firm—Thelen Reid & Priest; John P. Schaub

(57) ABSTRACT

The invention is an improved method and apparatus for implementing the "least-recently-used" (LRU) replacement algorithm in a memory. A counter keeps count of the number of memory accesses. Each block in the memory is associated with a time tag that represents an approximation of the age in the memory. The criteria for updating a time tag is based upon the value of the counter and the time tag. The block with a time tag value representing the highest residence time in memory with respect to the other time tags is always replaced first. The time tag for the most recently accessed block is set to a value representing the least residence time in memory and the other time tags are updated based upon their age in the memory.

43 Claims, 6 Drawing Sheets

| ACCESS COUNT | 0 | 1 | 2 | 3 | 4 | 5 | 6 | 7 | 8 | 9 | 10 |
|---|---|---|---|---|---|---|---|---|---|---|---|
| | | D | A | A | E | B | C | A | F | E | G |
| FRAME1 | 0:A | 1:A | 0:A | 0:A | 1:A | 2:A | 2:A | 0:A | 1:A | 2:A | G:0 |
| FRAME2 | 0:B | 1:B | 1:B | 2:B | 2:B | 0:B | 1:B | 2:B | 2:B | 2:B | 2:B |
| FRAME3 | 0:C | 1:C | 1:C | 2:C | 2:C | 2:C | 0:C | 1:C | 1:C | 2:C | 2:C |
| FRAME4 | 0:D | 0:D | 1:D | 2:D | 2:D | 2:D | 2:D | 3:D | 0:F | 1:F | 1:F |
| FRAME5 | 0:E | 1:E | 1:E | 2:E | 0:E | 1:E | 1:E | 2:E | 2:E | 0:E | 1:E |

FIG. 7

METHOD AND APPARATUS FOR APPROXIMATED LEAST-RECENTLY-USED ALGORITHM MEMORY REPLACEMENT

BACKGROUND OF THE INVENTION

1. Field of the Invention

The present invention relates to the field of memory management. More particularly, the present invention relates to methods and apparatus for replacing the contents of a memory.

2. Background

The terms memory and storage have been used interchangeably. Of the two terms, storage is used more commonly. Programs and data must be in main storage in order to be run or referenced directly. A random access memory (RAM) is typically used for the main storage. Programs or data not needed immediately may be kept in a secondary storage until needed and then brought into the main storage for execution or reference. Secondary storage provides large, inexpensive storage for the abundance of programs and data that must be kept readily available for processing. Some typical examples of secondary storage include disks, tapes and drums. Main storage is typically accessible much faster than secondary storage.

Referring to FIG. 1, computer systems typically have several levels of storage, requiring multiple data transfers between the various levels. This data transfer consumes system resources such as central processing unit (CPU) time that could otherwise be put to productive use. An improvement in system resource utilization is made possible by using a cache 1. A cache 1 is a high-speed storage that is much faster than the main storage 2. Cache 1 is typically extremely expensive compared with main storage 2 and therefore only relatively small caches are used.

Cache 1 requires one additional level of data transfer on the system. Programs and data in the main storage 2 are transferred to the high-speed cache 1 before being executed. When the CPU requests data that is not already in cache 1 or main storage 2, a block containing the requested data is read from secondary storage 3. The data is retained in the cache 1 with the hope that subsequently requested data will already be in the cache 1. Successful cache 1 utilization requires that the overhead involved in transferring programs between storage layers 1, 2 and 3 is smaller than the performance increase obtained by the faster execution possible in the cache 1.

The performance of a system utilizing a cache may be measured according to its hit ratio. A "hit" is defined as a request for data, which is already in cache 1. A "miss" is defined as a request for data that is not already in cache 1. The hit ratio is defined as the number of hits divided by the total number of cache accesses. Due to the performance advantages of using a cache 1, data already in cache 1 is kept there as long as possible, thus maximizing the hit ratio. However, data in cache 1 must be replaced when the cache 1 is full and additional data not already in cache 1 is requested.

One typical method of determining which data in cache 1 to replace is "first-in-first-out" (FIFO). Each data set, or frame, is time-stamped when it is placed in cache 1. When a frame needs to be replaced, the frame with the oldest time-stamp is chosen. Unfortunately, the FIFO method is likely to replace heavily used frames because the reason a frame may be in cache 1 for a long period may be because it is in constant use.

Another typical replacement method is "least-recently-used" (LRU). This method selects the frame for replacement that has not been used for the longest time. LRU assumes the recent past is a good indicator of the near future. It is typically implemented with timers or counters that determine the amount of time elapsed since a frame was accessed.

LRU timer implementations require complicated timing circuitry. Moreover, LRU timer implementations require a time stamp update every time a page is accessed. These factors can require substantial overhead, both in terms of timing and memory.

LRU counter implementations typically employ linear counters to indicate the age in cache 1 of the associated cache data. With every cache 1 access, a time tag is incremented if the associated frame is not the frame requested. Since the counters are linear, a large number of bits are required to represent the age in cache 1 of the associated frame. The advantages of using a time tag lessen when the number of accesses between replacements typically exceeds the maximum number represented by the time tag. Past this point, there is no way to distinguish the age of the data. Consequently, LRU cache replacement is often not implemented in current systems. A need exists in the prior art for a cache replacement method and apparatus that approximates LRU and requires minimal overhead.

BRIEF DESCRIPTION OF THE INVENTION

A method and apparatus for efficiently replacing the contents of a memory is disclosed. The memory comprises a plurality of data blocks and associated time tags. Each time tag approximates the age in the memory for the associated block. A memory access count is updated with every memory access. The time tags for all memory blocks are updated to reflect their age in memory based upon the memory access count. When a memory miss occurs, the block with a time tag value representing the highest residence time in memory with respect to other time tags is replaced with the new block and the new block is assigned a time tag value representing the least amount of time in memory. When a memory hit occurs, the requested block is assigned a time tag value representing the least amount of time in memory.

BRIEF DESCRIPTION OF THE DRAWINGS

FIG. 7 is a block diagram showing data movement and time tag updates in a few sample transactions in accordance with an embodiment of the present invention.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

According to the present invention, the LRU replacement algorithm is implemented by associating each block in cache memory with a small time tag. The invention is particularly useful for systems with non-linear distributions of residence in cache over time such as texture cache replacement in graphics applications, where cache replacement is often exponentially distributed.

The use of the term "cache memory" is not intended to be limiting in any way. For the purpose of this disclosure, the term "cache memory" applies to any memory in which the contents of the memory are replaced.

Each time tag approximates the age in cache of its associated block. The block with the highest time tag value is replaced first. The block just substituted is assigned the lowest time tag value. A cache access count maintains the number of cache access requests. A time tag is "bumped" when its value is incremented by one. The criteria for bumping a time tag is based upon the current time tag value and the cache access count.

Those of ordinary skill in the art will recognize that other time tag update methods may be employed. For example, the highest value of a time tag could represent the lowest age in cache. In this case, a time tag would be "bumped" when its value was decremented by a number.

Figure 2:
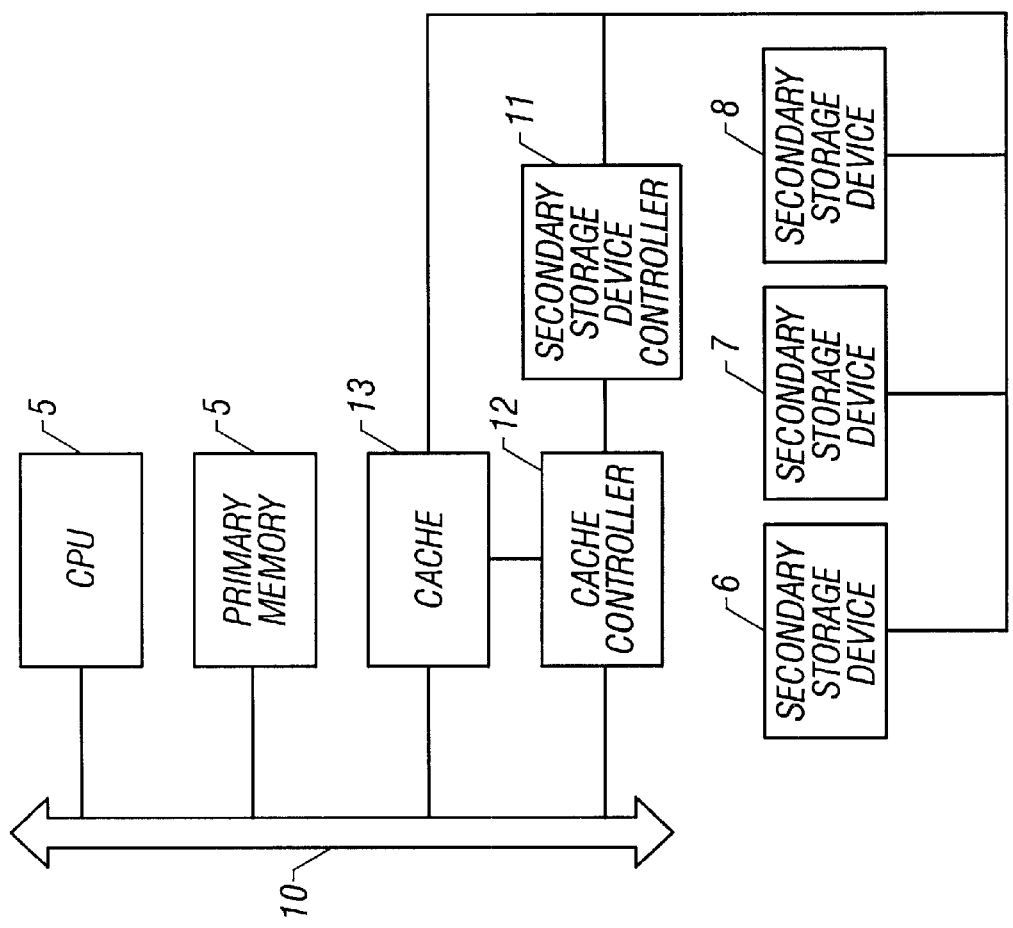
FIG. 2 is a block diagram illustrating an embodiment of the present invention.
Figure 1:
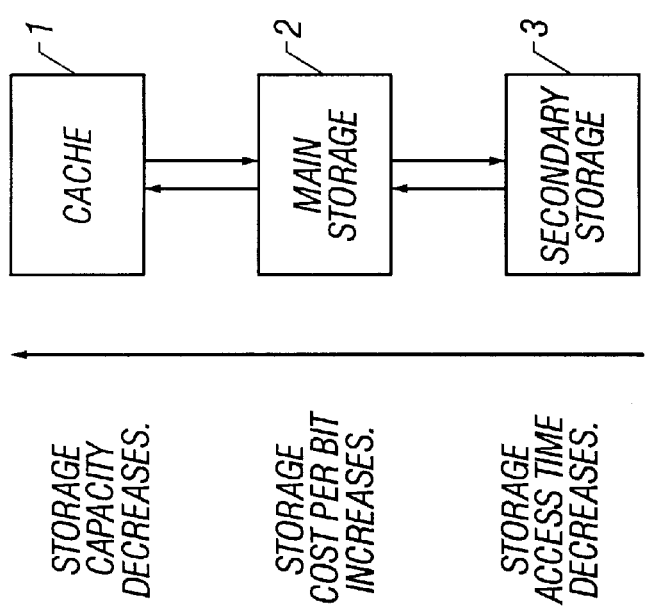
FIG. 1 is a block diagram illustrating a typical hierarchical storage organization.

Referring now to FIG. 2, the CPU 5 initiates a request for data. If the requested data is in the cache 13, it is sent over bus 10 to primary memory 9. If the requested data is not in cache 13, the request is passed on to the secondary storage device controller 11. The secondary storage device controller 11 determines which secondary storage device 6–8 contains the requested data and where the data is located within that device. The requested data is sent from the secondary storage device which contains the data (either reference numeral 6, 7, or 8 in this example) to the cache 13. The requested data is then sent from the cache 13 to the primary memory 9 via bus 10.

The use of three secondary storage devices is not intended to be limiting in any way. One of ordinary skill in the art will recognize that any number of secondary storage devices may be used in accordance with the present invention. Furthermore, the invention applies to systems employing no secondary storage devices.

Figure 3:
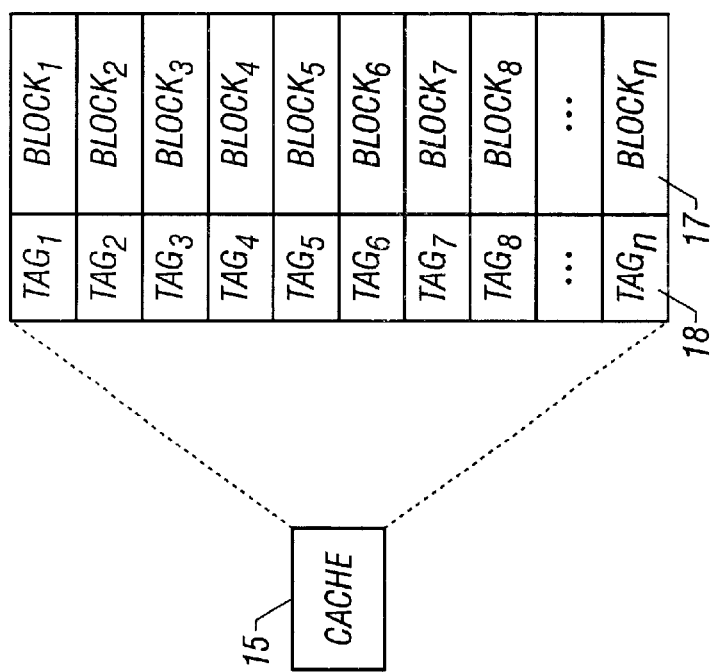
FIG. 3 is a block diagram illustrating the cache memory of an embodiment of the present invention.

Referring now to FIG. 3, a block diagram illustrating the structure of cache memory in a presently preferred embodiment of the present invention is presented. Cache memory 15 comprises a plurality of frames 16. Each frame 16 comprises a block 17 and a time tag 18. A block 17 is a unit of data and a time tag 18 contains an approximation of the amount of time since the corresponding block 17 was accessed. A low time tag 18 indicates the block 17 was accessed recently, while a high time tag 18 indicates the block 17 was accessed less recently. When a request is made for data not already in cache 15, the block 17 corresponding to the time tag 18 with the highest value is replaced with the block 17 containing the requested data.

Figure 4:
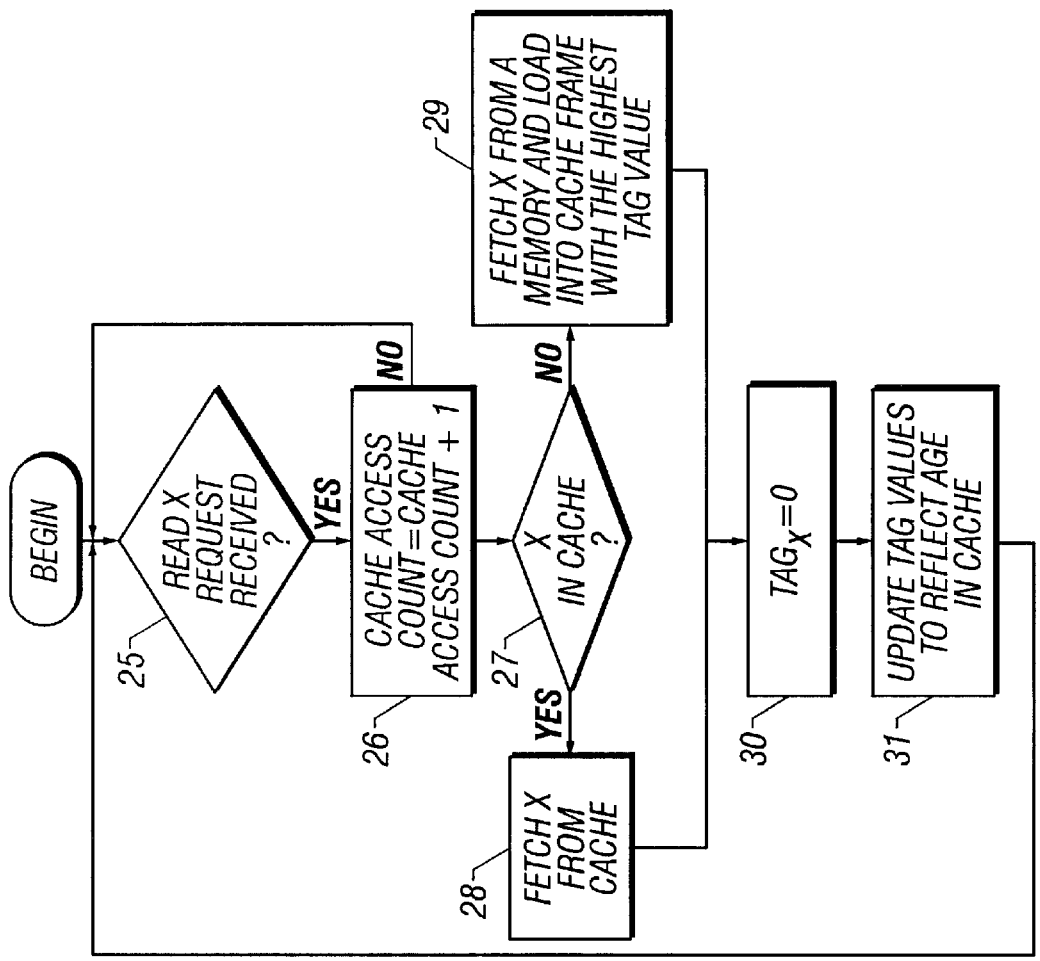
FIG. 4 is a flow diagram illustrating a method for cache replacement in accordance with an embodiment of the present invention.

Referring now to FIG. 4, a method for the present invention is illustrated. At reference numeral 25, the cache controller 12 determines whether a data read has been requested. When there is a read request, the cache controller 12 increments a cache access count at reference numeral 26. The cache access count maintains the number cache 13 references. At reference numeral 27, the cache controller 12 determines whether the requested data (X) is in the cache 13. At reference numeral 28, if X is in cache 13, X is fetched from cache 13. At reference numeral 28, if X is not in cache 13, the block containing X is fetched from a memory and loaded into the cache frame 18 with the highest time tag 18 value. If more than one frame shares the same highest value, any of the frames 16 with that value may be replaced. At reference numeral 30, the time tag 18 for X is set to zero. At reference numeral 31, the time tags 18 are updated to reflect the age in cache 13 of their associated blocks.

Figure 5:
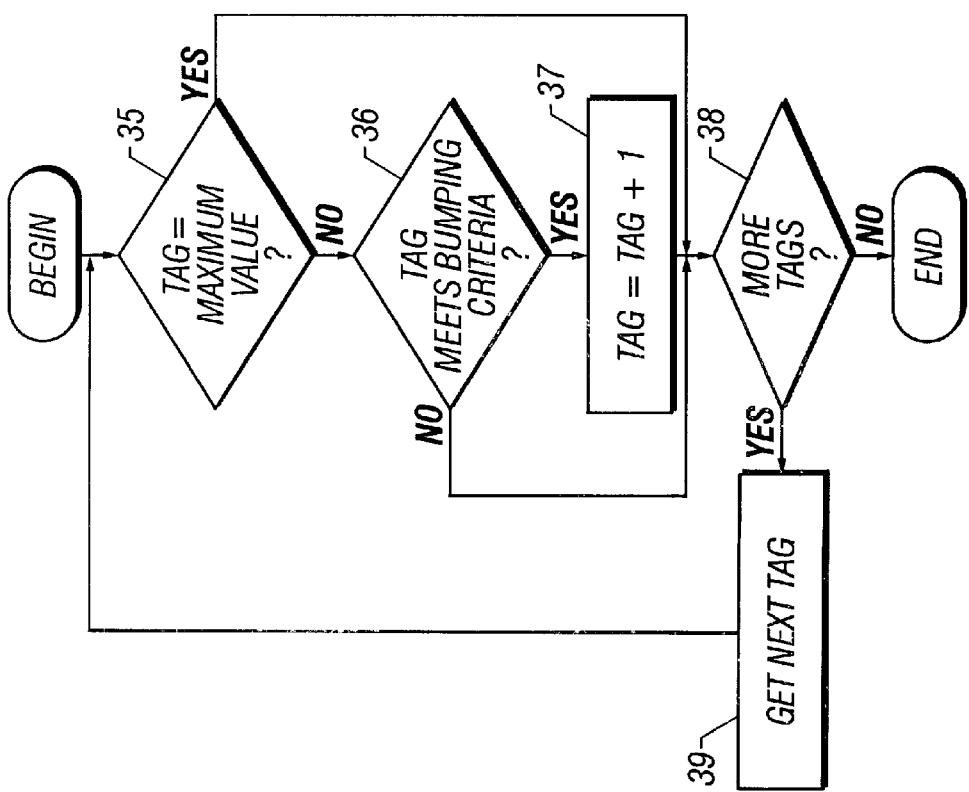
FIG. 5 is a flow diagram illustrating a method for updating time tags in accordance with an embodiment of the present invention.

Referring now to FIG. 5, a detailed flow diagram of updating time tag values to represent the age in cache of the corresponding blocks is presented. This corresponds to FIG. 4, reference numeral 31. At reference numeral 35, the cache controller 12 determines whether a time tag 18 contains the maximum possible time tag 18 value. If the time tag 18 is already at its maximum value, it may not be bumped. If the time tag 18 is not at its maximum value, the cache controller 12 ascertains whether the time tag 18 meets its bump criteria at reference numeral 36. This bump criteria is based on the time tag 18 value and the cache access count. At reference numeral 37, the time tag is bumped if the bump criteria is met. At reference numeral 38, the cache controller 12 determines whether more time tags 18 must be processed. If more time tags 18 must be processed, the next time tag 18 is obtained at reference numeral 39 and execution continues at reference number 35. If no time tags 18 require processing, the time tag 18 update is complete.

According to a presently preferred embodiment of the present invention, the time tags 18 are updated to reflect an approximation of the exponential age in cache 13 of the associated blocks. If a three-bit time tag 18 is used to approximate the power of two age in cache 13, a history space of $2^8$ or 128 accesses can be represented. The possible time tag 18 values and the criteria for bumping a time tag 18 are illustrated in Table 1 below. An "X" represents the bits that are not necessary to decode the value. Only the least significant bits are required to decode the value, plus one bit in the compare.

TABLE 1

| Time tag Value | Cache Access Count at Bump |
| --- | --- |
| 0 | Any |
| 1 | X1 |
| 2 | X3 |
| 3 | X7 |
| 4 | X15 |
| 5 | X31 |
| 6 | X63 |
| 7 | Never |

Figure 6:
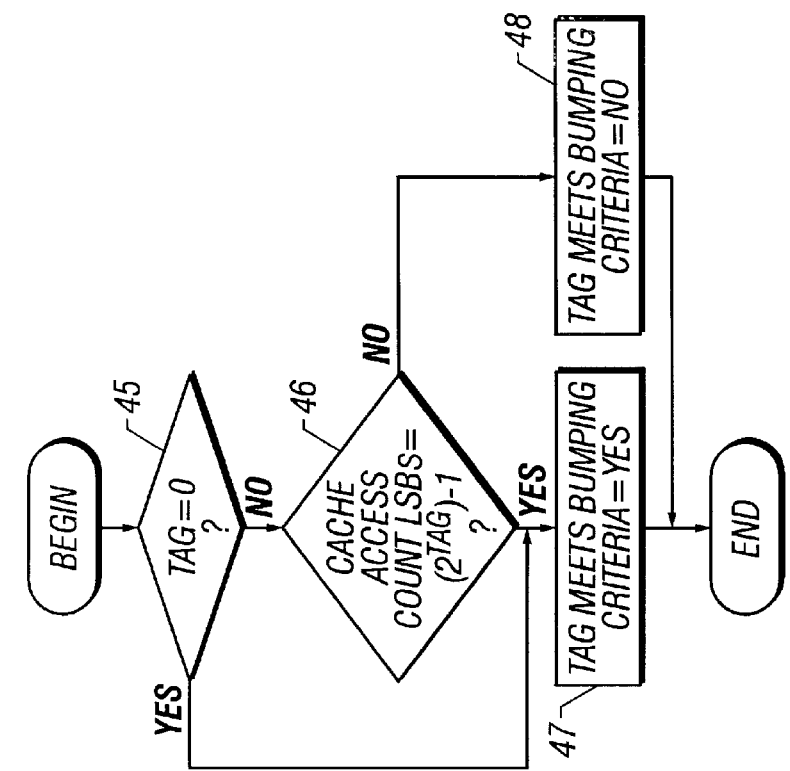
FIG. 6 is a flow diagram illustrating a power of two method for updating time tags in accordance with an embodiment of the present invention.

Referring now to FIG. 6, a detailed flow diagram of the determination of whether a power of two time tag meets its bumping criteria is presented. This corresponds to reference numeral 36 in FIG. 5 for the power of two embodiment. At reference numeral 45, the cache controller 12 determines whether the time tag value 18 is zero. At reference numeral 47, the bump criteria for the time tag 18 is met if the time tag 18 value reference numeral 46, if the time tag 18 value is not zero, the cache controller 12 ascertains whether the least significant bits (LSBs) of the cache access count equal $(2^{time\ tag})-1$. At reference numeral 47, the bump criteria for the time tag 18 is met if the cache access count LSBs equal $(2^{time\ tag})-1$. At reference numeral 48, the bump criteria for th time tag 18 is not met if the time tag 18 is nonzero and the cache access count LSBs do not equal $(2^{time\ tag})-1$.

The illustration of power of two age in cache 13 is not intended to be limiting in any way. Those of ordinary skill in the art will recognize that other exponential distributions may be approximated, including a poisson distribution, $\lambda t$. Those of ordinary skill in the art will also recognize that time tags 18 with more than or less than three bits may be used.

Referring now to FIG. 7, the time tag changes caused by some sample transactions in a cache 13 with three-bit time tags 18 approximating the power of two age in cache 13 is illustrated. A cache 13 containing only five frames 16 is illustrated in order to avoid unnecessarily obscuring the present invention. Those of ordinary skill in the art will recognize an actual cache 13 would likely have more frames 16. The vertical axis shows the cache access count 56 and five frames 57–61. Each column 62 shows the result of the request for the data frame designated at the top of the column 63. Column 64 shows the initial state for this example. The first component 65 of each frame entry represents the time tag 18. The second component 66 of each frame entry represents the block 17. At 67, cache frame one 57 initially contains block A, which has a time tag 18 value of zero.

At 64, the access count and all time tags 18 are initially zero. At 68, block D is requested and the cache access count is incremented by one. Since block D is already in frame four 60, the block is fetched from frame four 60 and the time tag 18 for frame four 60 is set to zero. Since all other time tags are zero, they are bumped.

At 69, block A is requested. Since block A is already in frame one 57, the block is fetched from frame one 57 and the time tag 18 for frame one 57 is set to zero. Since the cache access counter 56 is two, the bumping criteria is not met for any of the frames. Thus, the time tags 18 for the frames other than frame one 57 remain at one.

At 70, block A is requested again. The data for block A is fetched from frame one 57 and the time tag 18 for frame one 57 are set to zero. Since the time tags for the other frames are one and the least significant bits of the cache access counter are three, the time tags for the other frames are bumped.

At 71, block E is requested. Since block E is already in frame five 61, the block is fetched from frame five 61 and the time tag 18 for frame five 61 is set to zero. Since the cache access counter 56 is 4, only the time tag for frame one 57 is bumped.

At 72, block B is requested. Since block B is already in frame two 58, the block is fetched from frame two 58 and the time tag 18 for frame two is set to zero. The time tags for frames one 57 and five 61 are bumped.

At 73, block C is requested. Since block C is already in frame three 59, the block is fetched from frame three 59 and the time tag 18 for frame three 59 is set to zero. The time tag for frame two 58 is bumped.

At 74, block A is requested a third time. Since block A is already in frame one 57, the block is fetched from frame one 57 and the time tag 18 for frame one 57 is set to zero. Since the LSBs of the cache access counter 56 are 7, the time tags for frames two 58, three 59, four 60 and five 61 are bumped.

At 75, block F is requested. Since block F is not already in cache 13, it must be fetched from a memory and placed into the frame with the highest time tag. Frame four 60 has the highest value (3). Thus, block F is placed in frame four 60 and the time tag for frame four 60 is set to zero. The time tag for frame one 57 is also bumped.

At 76, block E is requested once again, setting the time tag for frame five 61 to zero. The bumping criteria is also met for frames one 57, frame three 59 and frame four 60.

At 62, block G is requested for the first time. The highest time tag value (2) is shared by frame one 57, frame two 58 and frame three 59. Frame one 57 receives block G and its counter is set to zero. Either frame two 58 or frame three 59 would have sufficed as well. The bumping criteria is also met for frame five 61.

According to another embodiment of the present invention, time tags 18 are bumped at prime number multiples. If a three-bit time tag 18 is used to approximate the age in cache 15 of associated blocks, a history space of nineteen accesses can be represented. The possible time tags 18 and the criteria for bumping a time tag 18 are illustrated in Table 2 below. Those of ordinary skill in the art will recognize that more accesses may be represented with the same number of bits by using non-consecutive prime numbers.

TABLE 2

| Time tag Value | Cache Access Count at Bump |
|---|---|
| 0 | Any |
| 1 | 1 |
| 2 | 3 |
| 3 | 7 |
| 4 | 11 |
| 5 | 13 |
| 6 | 17 |
| 7 | Never |

Figure 8:
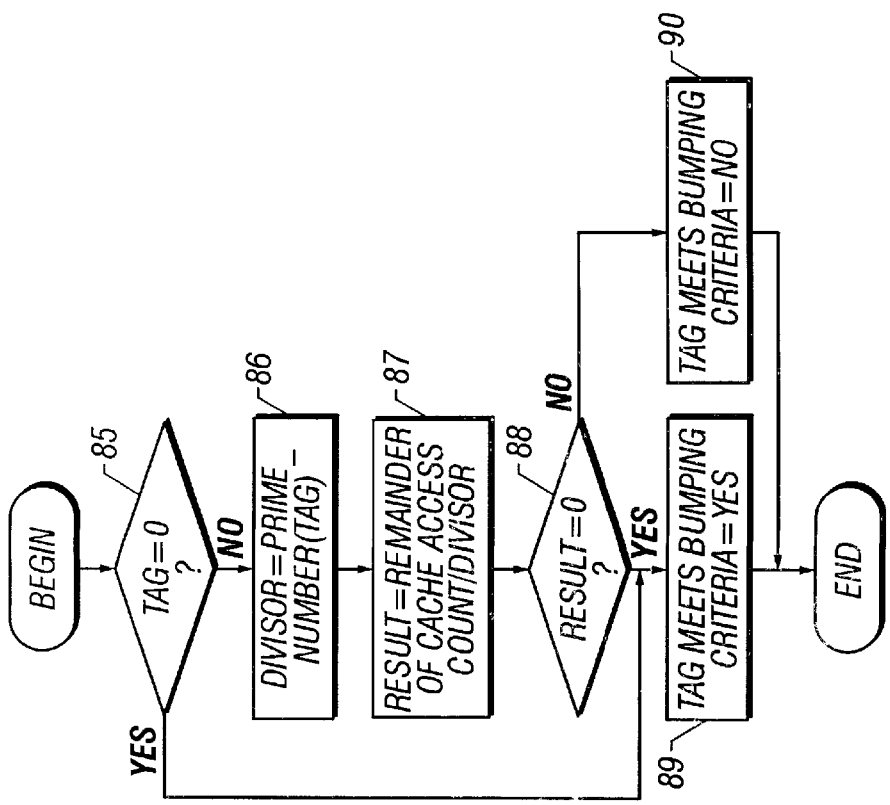
FIG. 8 is a flow diagram illustrating a prime number method for updating time tags in accordance with an embodiment of the present invention.

Referring now to FIG. 8, a detailed flow diagram of the determination of whether a prime number time tag meets its bumping criteria is presented. This corresponds to reference numeral 36 in FIG. 5 for the prime number embodiment. At reference numeral 85, the cache controller 12 determines whether the time tag 18 value is zero. At reference numeral 89, the bump criteria for the time tag 18 is met if the time tag 18 value is zero. At reference numeral 86, if the time tag 18 value is not zero, the cache controller 12 determines which prime number is associated with the current time tag 18 value. At reference numeral 87, the cache controller 12 divides the cache access count by the prime number associated with the current time tag 18 value and assigns the remainder of the division to a result. At reference numeral 88, the cache controller 12 ascertains whether the result is zero. At reference numeral 89, the bump criteria for the time tag 18 is met if result is zero. At reference numeral 90, the bump criteria for the time tag is not met is the result is nonzero.

According to another embodiment of the present invention, time tags 18 are bumped when a number associated with the current time tag 18 value divides evenly into the cache access count. An example for a system employing a three-bit time tag 18 is shown in Table 3 below. In the example shown, more than seventy cache 13 accesses may be represented. Those of ordinary skill in the art will recognize that any set of numbers may be used in the "Cache Access Count at Bump" column of Table 3.

| Time tag Value | Cache Access Count at Bump |
|---|---|
| 0 | Nil |
| 1 | 10 |
| 2 | 20 |
| 3 | 35 |
| 4 | 50 |
| 5 | 55 |
| 6 | 70 |
| 7 | Never |

Figure 9:
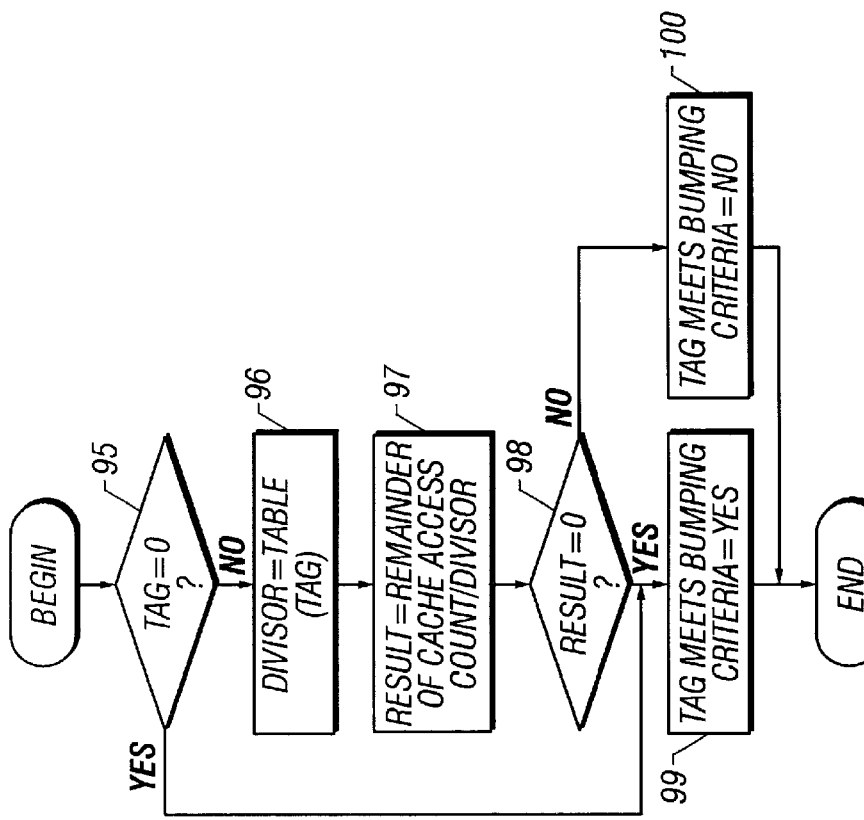
FIG. 9 is a flow diagram illustrating a table driven method for updating time tags in accordance with an embodiment of the present invention.

Referring now to FIG. 9, a detailed flow diagram of the determination of whether a table-based time tag meets its bumping criteria is presented. This corresponds to referecnce numeral 36 in FIG. 5 for the table-based embodiment. At reference numeral 95, the cache controller 12 determines whether the time tag 18 value is zero. At reference numeral 99, the bump criteria for the time tag 18 is met if the time tag 18 value is zero. At reference numeral 96, if the time tag value is not zero, the cache controller 12 determines which number in a table is associated with the current time tag 18 value. At reference numeral 97, the cache controller 12 divides the cache access count by the number associated with the current time tag 18 value and assigns the remainder of the division to a result. At reference numeral 98, the cache controller 12 ascertains whether the result is zero. At reference numeral 99, the bump criteria for the time tag 18 is met if the result is zero. At reference numeral 100, the bump criteria for the time tag 18 is not met if the result is nonzero.

According to another embodiment of the present invention, the cache replacement algorithm is adaptive. The criteria for bumping a time tag 18 changes dynamically to fine-tune the number of replacements occurring at the various time tag 18 values. This is done so that the nonlinear properties of the residence in cache are accounted for. In a system having three-bit time tags 18, the possible time tag 18 values range from zero to seven. Optimally, most cache replacements in this system should occur at time tag 18 values of six. If most cache replacements occur when the time tags 18 are zero through five, the criteria for bumping time tags 18 is relaxed. If most cache replacements occur when the time tags 18 are seven, the criteria for bumping time tags 18 is strengthened. The attempt to maximize replacements at time tag 18 values corresponding to one less than the maximum time tag value, or six in the present example, is not intended to be limiting in any way. Those of ordinary skill in the art will recognize replacements at other time tag values may also be maximized.

Figure 10:
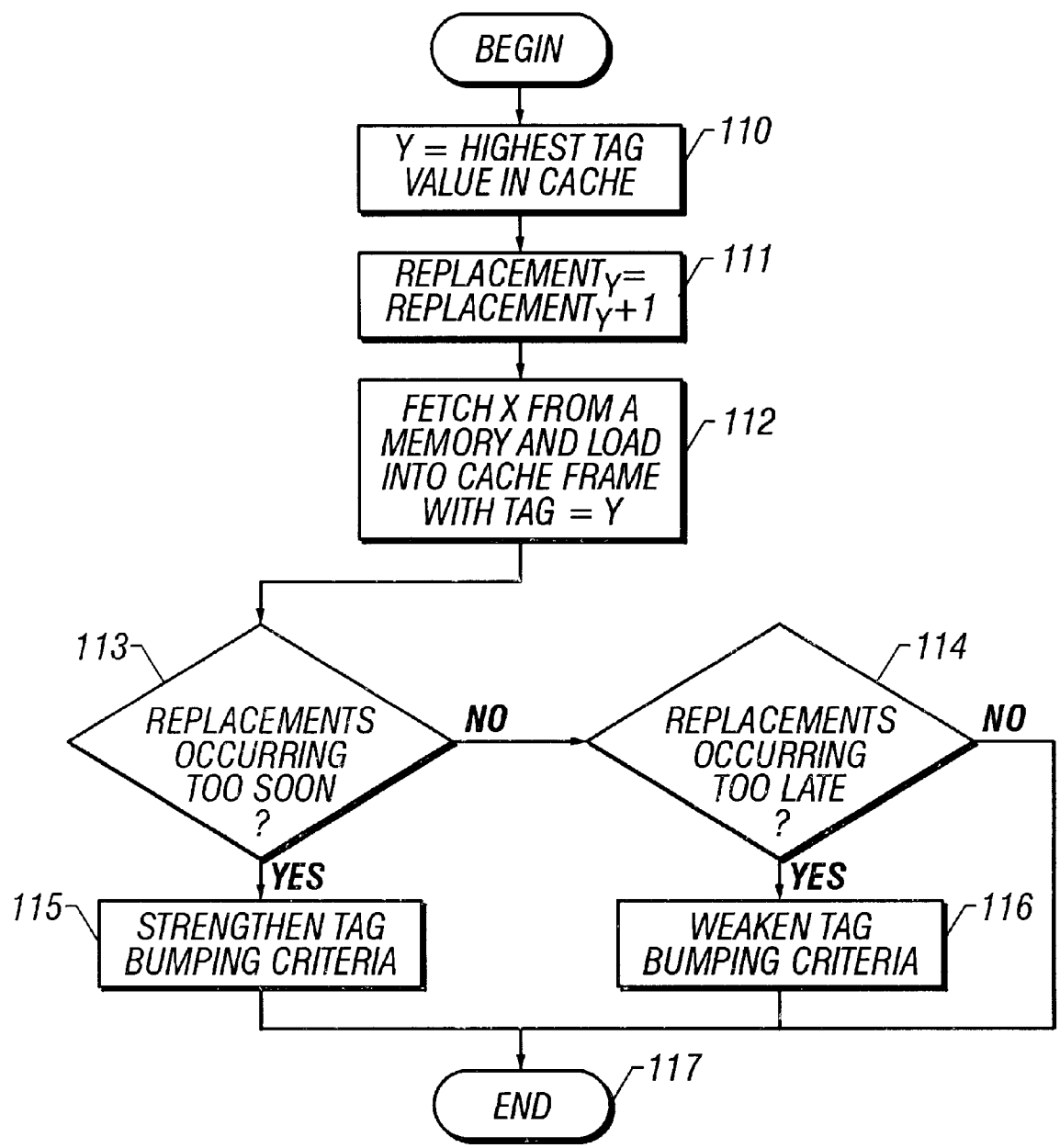
FIG. 10 is a flow diagram illustrating a method for adaptively updating time tags in accordance with an embodiment of the present invention.

Referring now to FIG. 10, a flow diagram for the adaptive approximated LRU cache replacement embodiment is presented. This corresponds to reference numeral 29 in FIG. 4 for the adaptive approximated LRU cache replacement embodiment. At reference numeral 110, the highest time tag 18 value in cache 15 (Y) is determined. At reference numeral 111, a count of the total number of replacements occurring for time tags equal to Y is incremented by one. At reference numeral 112, a block containing the data requested (X) is fetched from a memory. X is loaded into a cache frame 16 that has a time tag 18 equal to Y. At reference numeral 113, the cache controller 12 determines whether cache 13 replacements are occurring too soon. The time tag 18 bumping criteria is strengthened at reference numeral 115 if cache replacements are occurring too soon. If cache 13 replacements are not occurring too soon, at reference numeral 114, the cache controller 12 determines whether cache replacements are occurring too late. At reference numeral 116, the time tag 18 bumping criteria is weakened if cache 13 replacements are occurring too late. At reference numeral 17, the adaptive replacement algorithm is complete when the time tag bumping criteria has been changed, or when no change was necessary.

Those of ordinary skill in the art will recognize that various methods may be used to strengthen or weaken the time tag 18 bumping criteria. Strengthening the criteria requires more cache 13 accesses before a time tag 18 is bumped. Weakening the criteria requires less cache 13 accesses before the time tag 18 is bumped. For example, in a prime number embodiment employing the time tag 18 bumping criteria in Table 2 above, time tag 18 values are bumped from six to seven when the cache access count is a multiple of the prime number seventeen. If most cache 13 replacements are desired at time tag 18 value five but most occur at time tag 18 value six, the time tag 18 bumping criteria must be strengthened. One way to strengthen the criteria would be to change the value associated with time tag 18 value five from thirteen to seventeen, and change the value associated with time tag value six from seventeen to nineteen. Likewise, the reverse applies to weakening the time tag 18 bumping criteria.

According to a presently preferred embodiment, the present invention may be implemented in software or firmware, as well as in programmable gate array devices, ASICs and other hardware.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for data replacement, comprising:
   a bus;
   a first memory coupled to said bus, said first memory including a plurality of frames wherein each frame contains a data block and has an associated time tag field for receiving a time tag, said time tag approximating the age of said data block in said first memory; and
   a second memory coupled to said bus to provide data to and accept data from said first memory,
   wherein the time tag associated with a requested data block is reset as a result of having been requested.

2. The apparatus of claim 1 wherein said first memory is a cache memory.

3. The apparatus of claim 2, further comprising a secondary storage device coupled to said cache memory and providing data to and accepting data from said cache memory.

4. The apparatus of claim 2 wherein said time tag comprises a nonlinear approximation of the age of said data block in said cache memory.

5. The apparatus of claim 4 wherein said time tag comprises an exponential approximation of the age of said data block in said cache memory.

6. The apparatus of claim 5 wherein said time tag comprises a power of two approximation of the age of said data block in said cache memory.

7. The apparatus of claim 2 wherein said time tag includes three bits representing a power of two approximation of the age of said data block in said cache memory.

8. The apparatus of claim 2 wherein said time tag comprises a prime number approximation of the age of said data block in said cache memory.

9. The apparatus of claim 2 wherein said time tag comprises a table-driven approximation of the age of said data block in said cache memory.

10. A computer system having cache replacement, comprising:
- a bus;
- a primary memory coupled to said bus;
- a cache memory coupled to said bus, said cache memory including a plurality of frames wherein each frame contains a data block and has an associated time tag field for receiving a time tag, said time tag approximating the age of said data block in said cache memory;
- a cache memory controller coupled to said bus;
- one or more secondary storage devices coupled to said cache memory and providing data to and accepting data from said cache memory;
- a central processing unit (CPU) coupled to said bus and providing requests to said cache memory controller for moving data between said secondary storage devices and said primary memory; and
- a secondary storage controller coupled to said cache memory controller and said one or more secondary storage devices, said one or more secondary storage devices providing data to said cache memory in response to a request from said secondary storage controller for data, said secondary storage controller operative in response to a request from said cache memory controller for data, said cache memory controller sending a request for data to said secondary storage controller in response to a request from said CPU for data, said cache memory controller maintaining the blocks of cache data in the least-recently used order by being operative each time a data block is requested that is not in said cache memory to replace the data block having the highest time tag with the new data block from said one or more secondary storage devices, and being operative each time a data block is requested that is in said cache to reset the time tag for the requested data block.

11. The computer system of claim 10 wherein said time tag comprises a nonlinear approximation of the age of said data block in said cache memory.

12. The computer system of claim 11 wherein said time tag comprises an exponential approximation of the age of said data block in said cache memory.

13. The computer system of claim 12 wherein said time tag comprises a power of two approximation of the age of said data block in said cache memory.

14. The computer system of claim 10 wherein said time tag includes three bits representing a power of two approximation of the age of said data block in said cache memory.

15. The computer system of claim 10 wherein said time tag comprises a prime number approximation of the age of said data block in said cache memory.

16. The computer system of claim 10 wherein said time tag comprises a table-driven approximation of the age of said data block in said cache memory.

17. A method for replacing the contents of a memory, said method comprising:
- determining whether a data read has been requested;
- updating a memory access counter in response to a data read request;
- determining whether the requested data is in the memory when a data read has been requested, the memory comprising a plurality of frames, each of said frames comprising a time tag and a block of data;
- fetching said requested data;
- replacing in the memory the frame having a time tag value representing the greatest residence time in memory with respect to the other time tags with said requested data when said requested data is not in the memory; and
- updating all time tags in the memory to approximate the age in the memory of said blocks in the memory, wherein the time tag associated with said requested data is reset as a result of having been requested.

18. The method of claim 17 wherein said memory is a cache memory.

19. The method of claim 18 wherein fetching the data comprises fetching the requested data from a memory if the requested data is not in the cache memory.

20. The method of claim 19, further comprising:
- counting the number of cache replacements at time tag value; and
- changing said updating of cache time tags based upon said cache access counter and said number of replacements at each time tag value.

21. The method of claim 20 wherein said approximation is nonlinear.

22. The method of claim 21 wherein said approximation of age in cache is an exponential approximation comprising:
- adding one to all time tags with zero values; and
- adding one to all time tags where the least significant n bits of said cache access counter equal $(b^n)-1$, where n equals the time tag and b equals the base.

23. The method of claim 22 wherein b is two.

24. The method of claim 23 wherein each of said time tags includes three bits representing a power of two approximation of the age of said data block in said cache memory.

25. The method of claim 20 wherein said approximation of age in cache comprises a prime number approximation comprising:
- adding one to all zero time tags; and
- adding one to all nonzero time tags when the cache access counter is a whole number multiple of a prime number operatively coupled to the time tag.

26. The method of claim 20 wherein said approximation of age in cache comprises a table-driven approximation comprising:
- adding one to all zero time tags; and
- adding one to all nonzero time tags when the cache access counter is a whole number multiple of a number operatively coupled to the time tag.

27. A program storage device readable by a machine, tangibly embodying a program of instructions executable by the machine to replace the contents of a first memory, the program of instructions comprising:
- determining whether a data read has been requested, the first memory comprising a plurality of frames, each of said frames comprising a time tag and a block of data;
- incrementing a first memory access counter;
- determining whether the requested data is in the first memory when a data read has been requested;
- fetching the requested data;
- loading the requested data into the first memory frame having the highest time tag value when the requested data is not in the first memory; and
- updating all the first memory time tags to approximate the age in the first memory of said blocks of data, wherein the time tag associated with the requested data is reset as a result of having been requested.

28. The program storage device of claim 27 wherein said first memory is a cache memory.

29. The program storage device of claim 28 wherein fetching the data comprises fetching the requested data from a second memory if the requested data is not in the cache memory.

30. The program storage device of claim 29, further comprising:
    counting the number of cache replacements at time tag value; and
    changing said updating of cache time tags based upon said cache access counter and said number of replacements at each time tag value.

31. An apparatus for data replacement comprising:
    a bus;
    a cache memory coupled to said bus, said cache memory including a plurality of frames wherein each frame contains a data block and has an associated time tag field for receiving a time tag, wherein said time tag comprises an exponential approximation of the age of said data block in said cache memory; and
    a second memory coupled to said bus to provide data to and accept data from said cache memory.

32. The apparatus of claim 31 wherein said time tag comprises a power of two approximation of the age of said data block in said cache memory.

33. An apparatus for data replacement comprising:
    a bus;
    a cache memory coupled to said bus, said cache memory including a plurality of frames wherein each frame contains a data block and has an associated time tag field for receiving a time tag, wherein said time tag includes three bits representing a power of two approximation of the age of said data block in said cache memory; and
    a second memory coupled to said bus to provide data to and accept data from said cache memory.

34. An apparatus for data replacement comprising:
    a bus;
    a cache memory coupled to said bus, said cache memory including a plurality of frames wherein each frame contains a data block and has an associated time tag field for receiving a time tag, wherein said time tag comprises a prime number approximation of the age of said data block in said cache memory; and
    a second memory coupled to said bus to provide data to and accept data from said cache memory.

35. A computer system having cache replacement, the computer comprising:
    a bus;
    a primary memory coupled to said bus;
    a cache memory coupled to said bus, said cache memory including a plurality of frames wherein each frame contains a data block and has an associated time tag field for receiving a time tag, wherein said time tag comprises an exponential approximation of the age of said data block in said cache memory;
    a cache memory controller coupled to said bus;
    one or more secondary storage devices coupled to said cache memory and providing data to and accepting data from said cache memory;
    a central processing unit (CPU) coupled to said bus and providing requests to said cache memory controller for moving data between said secondary storage devices and said primary memory; and
    a secondary storage controller coupled to said cache memory controller and said one or more secondary storage devices, said one or more secondary storage devices providing data to said cache memory in response to a request from said secondary storage controller for data, said secondary storage controller operative in response to a request from said cache memory controller for data, said cache memory controller sending a request for data to said secondary storage controller in response to a request from said CPU for data, said cache memory controller maintaining the blocks of cache data in the least-recently used order by being operative each time a data block is requested that is not in said cache memory to replace the data block having the highest time tag with the new data block from said one or more secondary storage devices, and being operative each time a data block is requested that is in said cache to zero the time tag for the data block.

36. The computer system of claim 35 wherein said time tag comprises a power of two approximation of the age of said data block in said cache memory.

37. A computer system having cache replacement, the computer comprising:
    a bus;
    a primary memory coupled to said bus;
    a cache memory coupled to said bus, said cache memory including a plurality of frames wherein each frame contains a data block and has an associated time tag field for receiving a time tag, wherein said time tag includes three bits representing a power of two approximation of the age of said data block in said cache memory;
    a cache memory controller coupled to said bus;
    one or more secondary storage devices coupled to said cache memory and providing data to and accepting data from said cache memory;
    a central processing unit (CPU) coupled to said bus and providing requests to said cache memory controller for moving data between said secondary storage devices and said primary memory; and
    a secondary storage controller coupled to said cache memory controller and said one or more secondary storage devices, said one or more secondary storage devices providing data to said cache memory in response to a request from said secondary storage controller for data, said secondary storage controller operative in response to a request from said cache memory controller for data, said cache memory controller sending a request for data to said secondary storage controller in response to a request from said CPU for data, said cache memory controller maintaining the blocks of cache data in the least-recently used order by being operative each time a data block is requested that is not in said cache memory to replace the data block having the highest time tag with the new data block from said one or more secondary storage devices, and being operative each time a data block is requested that is in said cache to zero the time tag for the data block.

38. A computer system having cache replacement, the computer comprising:
    a bus;
    a primary memory coupled to said bus;
    a cache memory coupled to said bus, said cache memory including a plurality of frames wherein each frame contains a data block and has an associated time tag field for receiving a time tag, wherein said time tag comprises a prime number approximation of the age of said data block in said cache memory;

a cache memory controller coupled to said bus;

one or more secondary storage devices coupled to said cache memory and providing data to and accepting data from said cache memory;

a central processing unit (CPU) coupled to said bus and providing requests to said cache memory controller for moving data between said secondary storage devices and said primary memory; and a secondary storage controller coupled to said cache memory controller and said one or more secondary storage devices, said one or more secondary storage devices providing data to said cache memory in response to a request from said secondary storage controller for data, said secondary storage controller operative in response to a request from said cache memory controller for data, said cache memory controller sending a request for data to said secondary storage controller in response to a request from said CPU for data, said cache memory controller maintaining the blocks of cache data in the least-recently used order by being operative each time a data block is requested that is not in said cache memory to replace the data block having the highest time tag with the new data block from said one or more secondary storage devices, and being operative each time a data block is requested that is in said cache to zero the time tag for the data block.

39. A method for replacing the contents of a cache memory, said method comprising:

determining whether a data read has been requested;

updating a cache memory access counter in response to a data read request;

determining whether the requested data is in the cache memory when a data read has been requested, the cache memory comprising a plurality of frames, each of said frames comprising a time tag and a block of data;

fetching said requested data from the cache memory or from a secondary memory if the requested data is not in the cache memory;

replacing in the cache memory the frame having a time tag value representing the greatest residence time in memory with respect to the other time tags with said requested data when said requested data is not in the cache memory; and updating all time tags in the cache memory to approximate the age in the cache memory of said blocks in the cache memory, said updating comprising:

counting the number of cache replacements at time tag value; and changing said updating of cache time tags based upon said cache memory access counter and said number of cache replacements at each time tag value, wherein said approximation of the age in the cache memory is an exponential approximation comprising:

adding one to all time tags with zero values; and adding one to all time tags where the least significant n bits of said cache memory access counter equal $(b^n)-1$, where n equals the time tag and b equals the base.

40. The method of claim 39 wherein b has a value of two.

41. The method of claim 40 wherein each of said time tags includes three bits representing a power of two approximation of the age of said data block in said cache memory.

42. A method for replacing the contents of a cache memory, said method comprising:

determining whether a data read has been requested;

updating a cache memory access counter in response to a data read request;

determining whether the requested data is in the cache memory when a data read has been requested, the cache memory comprising a plurality of frames, each of said frames comprising a time tag and a block of data;

fetching said requested data from the cache memory or from a secondary memory if the requested data is not in the cache memory;

replacing in the cache memory the frame having a time tag value representing the greatest residence time in memory with respect to the other time tags with said requested data when said requested data is not in the cache memory; and updating all time tags in the cache memory to approximate the age in the cache memory of said blocks in the cache memory, said updating comprising:

counting the number of cache replacements at time tag value; and changing said updating of cache time tags based upon said cache memory access counter and said number of cache replacements at each time tag value, wherein said approximation of age in the cache memory comprises a prime number approximation comprising:

adding one to all zero time tags; and adding one to all nonzero time tags when the cache memory access counter is a whole number multiple of a prime number operatively coupled to the time tag.

43. A method for replacing the contents of a cache memory, said method comprising:

determining whether a data read has been requested;

updating a cache memory access counter in response to a data read request;

determining whether the requested data is in the cache memory when a data read has been requested, the cache memory comprising a plurality of frames, each of said frames comprising a time tag and a block of data;

fetching said requested data from the cache memory or from a secondary memory if the requested data is not in the cache memory;

replacing in the cache memory the frame having a time tag value representing the greatest residence time in memory with respect to the other time tags with said requested data when said requested data is not in the cache memory; and updating all time tags in the cache memory to approximate the age in the cache memory of said blocks in the cache memory, said updating comprising:

counting the number of cache replacements at time tag value; and changing said updating of cache time tags based upon said cache memory access counter and said number of cache replacements at each time tag value, wherein said approximation of age in the cache memory comprises a table-driven approximation comprising:

adding one to all zero time tags; and adding one to all nonzero time tags when the cache memory access counter is a whole number multiple of a number operatively coupled to the time tag.

* * * * *